United States Patent
Iwai et al.

(10) Patent No.: US 8,223,674 B2
(45) Date of Patent: Jul. 17, 2012

(54) SIGNAL RELAY DEVICE

(75) Inventors: Kazuhiro Iwai, Tokyo (JP); Masami Kanemaru, Tokyo (JP)

(73) Assignee: Fuji Electric Co., Ltd. (JP)

( * ) Notice: Subject to any disclaimer, the term of this patent is extended or adjusted under 35 U.S.C. 154(b) by 263 days.

(21) Appl. No.: 12/665,647

(22) PCT Filed: Jun. 17, 2008

(86) PCT No.: PCT/JP2008/061016
§ 371 (c)(1),
(2), (4) Date: Dec. 18, 2009

(87) PCT Pub. No.: WO2009/001709
PCT Pub. Date: Dec. 31, 2008

(65) Prior Publication Data
US 2010/0183006 A1      Jul. 22, 2010

(30) Foreign Application Priority Data

Jun. 28, 2007   (JP) ................. 2007-170257

(51) Int. Cl.
*H04L 5/14* (2006.01)
*H04L 12/28* (2006.01)
(52) U.S. Cl. ....................... 370/274; 370/401
(58) Field of Classification Search ........... 370/274, 370/359, 401, 492, 493
See application file for complete search history.

(56) References Cited

U.S. PATENT DOCUMENTS

| 6,480,122 | B1 * | 11/2002 | Oddy et al. | 340/999 |
|---|---|---|---|---|
| 7,218,614 | B1 * | 5/2007 | Leedy | 370/254 |
| 2003/0147381 | A1 * | 8/2003 | Nelson et al. | 370/352 |
| 2007/0047525 | A1 * | 3/2007 | He | 370/352 |
| 2007/0058608 | A1 * | 3/2007 | Lin | 370/352 |
| 2011/0080918 | A1 * | 4/2011 | Robitaille et al. | 370/401 |

FOREIGN PATENT DOCUMENTS

| JP | 2005-159617 | 6/2005 |
|---|---|---|
| JP | 2005-160055 | 6/2005 |
| JP | 2005-191881 | 7/2005 |
| JP | 2005-323259 | 11/2005 |
| JP | 2007-060802 | 3/2007 |

* cited by examiner

*Primary Examiner* — Hong Cho
(74) *Attorney, Agent, or Firm* — Stephen Chin (57) ABSTRACT

The invention is to provide a relay signal system or a device which enables the use of signal related services such as IP phone services even if a supply of power from a commercial AC power source is stopped, for instance, due to a power outage. The signal relay device comprises: a power reception terminal that is coupled to an AC power source, a plurality of connectors containing a plurality of terminal pins for receiving and transmitting signals such as packet signals in which the terminal pins are coupled to each other by wire, and a power charging unit, which is coupled to the power reception terminal by wire and stores a backup power charged by an AC power provided from the power reception terminal by wire and supplies the backup power to wires coupled to a part or all of the plurality of connectors.

2 Claims, 8 Drawing Sheets

| port | power supplying duration | phone number | IP address | call transfer destination |
|---|---|---|---|---|
| 2 | 60 minutes | ... | ... | ... |
| 3 | 15 minutes | ... | ... | ... |
| 4 | 15 minutes | ... | ... | ... |

SIGNAL RELAY DEVICE

CROSS REFERENCES TO RELATED APPLICATIONS

This application claims priority to international application number PCT/JP 2008/061016 filed on Jun. 17, 2008 which claims priority to Japanese patent application number 2007-170257 on Jun. 28, 2007, the entire disclosures of which are hereby incorporated by reference.

TECHNICAL FIELD

The present invention relates to a signal relay device.

BACKGROUND ART

Internet Protocol (IP) phone services have come into wide use for supporting a call between terminals which are installed with Voice over Internet Protocol (VoIP). In IP phone services, packetization of audio or voice signals and procedures relating to routing are executed in accordance with protocols, such as User Datagram Protocol (UDP) or IP, belonging in the transport Layer or the internet layer of the Transmission Control Protocol/Internet Protocol (TCP/IP). A user may access such services through a network device, such as a router, a repeater hub or a switching hub by only installing an application compliant with Session Initiation Protocol or H. 323, where these protocols manage call transmissions or call receptions at the high layer, in a user's terminal connected to the network device (Refer to the patent document 1 or 2 for detailed descriptions of SIP and H. 323).
[Patent Document 1] JP 2005-160055 A
[Patent Document 2] JP 2005-191881 A

DISCLOSURE OF INVENTION

Subject to be Solved by the Invention

A fixed-line telephone terminal can obtain electric power for operating itself though the transmission line from Public Switched Telephone Networks (PSTN). On the other hand, many of IP phone terminals, which may have the same appearances as fixed-line telephone terminals but are specific for the IP phone services, receive supply of power from respective network devices which lie between the IP phone terminals and the internet. The power supplied from network devices is called "inline power". Since the suppliers of the inline power are network devices that receive electric power from a commercial AC power source, the IP phone terminals are disabled if the supply of power to the network devices is stopped due to conditions such as a power failure.

On the above described background, the present invention is to provide a scheme for enabling the services such as IP phone services to be used even when power supply from a commercial AC power source is stopped due to a power failure or the like.

Means to Solve the Subject

According to a best mode of the present invention, a signal relay device comprises an electricity reception terminal which is connected with an AC power source, a plurality of connectors each of which contains a plurality of connection terminals including ones for inputting and outputting a signal such as a packet signal and of which the connection terminals are connected each other by electric wire, and an electricity storage means which is connected with the electricity reception terminal by electric wire and which stores a backup power in accordance with an AC power supplied from the electricity reception terminal through the electric wire, for discharging the electricity to electric wires connected with parts of or all of the connectors.

The signal relay device according to the present invention may further comprise a first switching device which is inserted in electric wires connecting the connection terminals with each other and which, according to a telephone terminal indicated as a destination of a packet by a signal input from one of the connection terminals, selects another connector and transmits the signal to an electric wire connected to the selected connector.

Each of the connectors may include a packet terminal for receiving and transmitting a signal representing a packet and a residual terminal that do not, and a second switching device is provided, between electric wires connected to residual terminals of the connectors respectively and a electric wire connected to the electricity storage means, for switching on or off the connections between the electric wires connected to the residual terminals and the electric wire connected to the electricity storage means individually.

The signal relay device may further comprise a memory for storing an address of a terminal device connected to any one of the connectors and a transfer destination data, correlated with the address, indicating a transfer destination of a packet addressed to the terminal device, a detection means for detecting voltage of AC power supplied from the electricity reception terminal, a control means for, if the voltage detected by the detection means satisfies a predetermined condition, supplying a signal instructing the second switching device to connect electric wires connected to residual terminals of some of the connectors respectively with the electric wire connected to the electricity storage means, specifying transfer destination data corresponding to one or more terminal addresses of terminal devices connected to the others of the connectors with referring the memory, and outputting a packet representing a transfer request message including the specified transfer destination data through ones of the connectors to which no terminal device is connected.

EFFECT OF THE INVENTION

The invention enables the use of signal related services such as IP phone services even if supply of power from a commercial AC power source is stopped due to a power failure or the like.

REFERENCE NUMERALS

10 VoIP network control device, 20 LAN, 30 router type modem, 31, 51 electricity reception terminal, 32, 52 power supply unit, 33 RJ11 connector, 34, 53, 71 RJ45 connector, 35 ADSL signal conversion circuit, 36, 55, 72 PHY chip, 37, 63, 73 ROM, 38, 64, 74 MPU, 39, 57, 65, 75 RAM, 40, 58 AC/DC converter, 41, 59 battery (corresponding to "electricity storage means"), 50 switching hub (corresponding to "signal relay device"), 54 transformer, 56 switching IC (corresponding to "first switching device"), 60 timer, 61 voltage detection unit (corresponding to "detection means"), 62 control unit (corresponding to "control means"), 66 switch (corresponding to ""second switching device), 70 IP phone terminal (corresponding to "terminal device"), 76 microphone, 77 loudspeaker, 78 LCD, 79 touch keys, 80 codec, 90 internet, 91 data, 92 UDP header, 93 IP header, 94 frame header

BEST MODE FOR CARRYING OUT THE INVENTION

[First Embodiment]

The signal relay device of a first embodiment of the invention will be explained with referring to the drawings. The specific feature of the present embodiment is that a battery is provided in a switching hub, which acts both as a supplier of inline power for an IP phone terminal and as a signal relay device, so that the inline power can be supplied stably to the IP phone terminal connected to the switching hub regardless of power failures.

Figure 1:
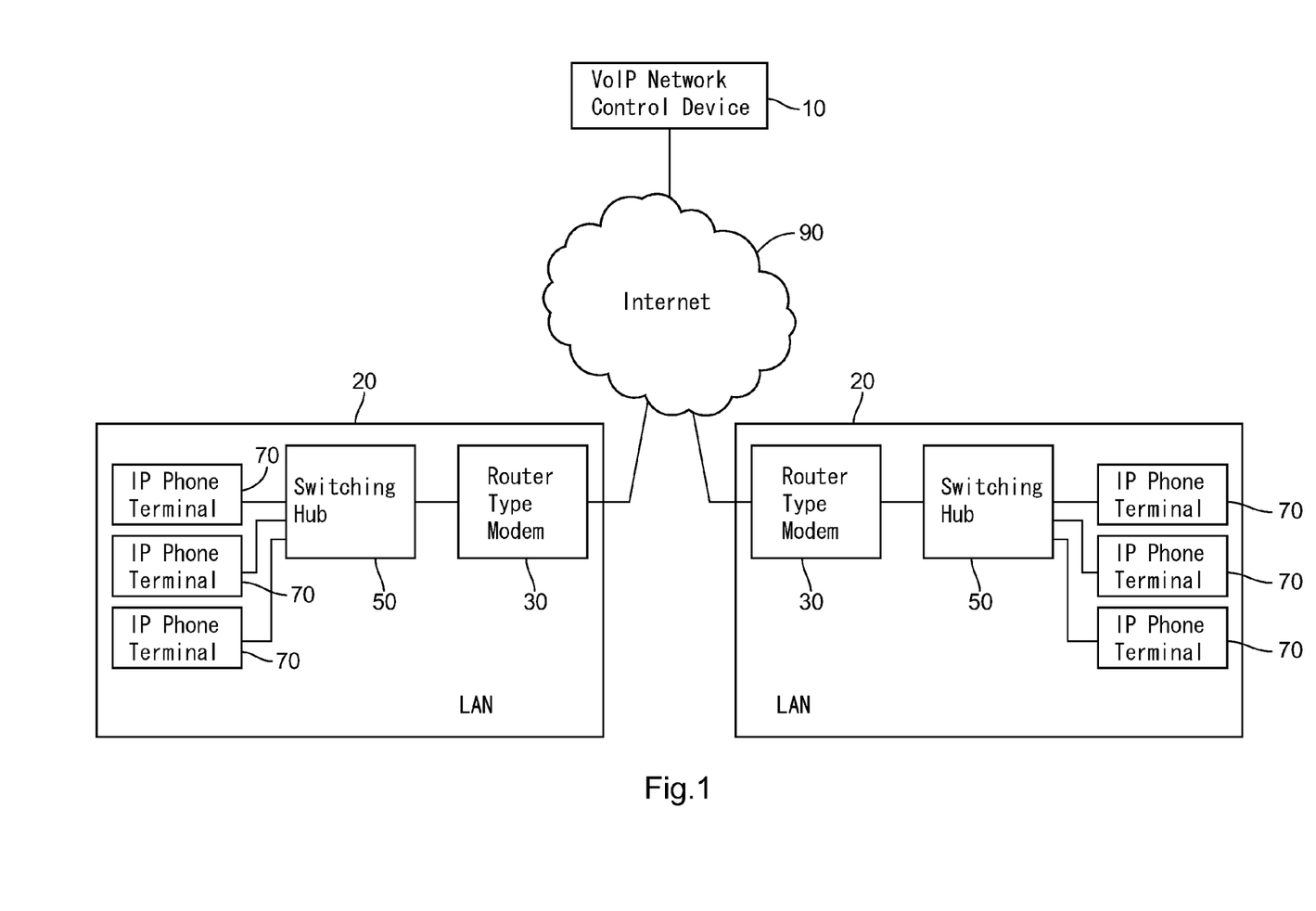
FIG. 1 is a diagram showing the overall configuration of an IP phone system including a signal relay device of a first embodiment.

FIG. 1 is a diagram showing an overall configuration of an IP phone system in the present embodiment. In this system, as shown in FIG. 1, a VoIP network control device 10 and a plurality of Local Area Networks (LAN) 20 provided with IP phone terminals 70 are connected through the internet 90. The internet 90 comprises nodes, each of which routes packets in accordance with TCP/IP, and phone lines which connect the nodes.

The VoIP network control device 10 comprises a computer comprising a micro processing unit (MPU), a random access memory (RAM), a read only memory (ROM), a hard disk, a network interface and so on. The VoIP network control device 10 supports calls among the IP phone terminals 70 by executing various processes, such as, conversion between the IP address and the phone number of each of the IP phone terminals 70, communication bandwidth control, congestion control and so on.

Each of the LANs 20 is configured by connecting a router type modem 30 and the IP phone terminals 70 (corresponding to "terminal device") with cables through respective switching hubs 50. The switching hubs 50 work as signal relay devices respectively. Each of the IP phone terminals 70 is installed with a program (called "SIP program" hereinafter) containing procedures for executing processes compliant with Session Initiation Protocol (SIP). Under support from the VoIP network control device 10, each of IP phone terminals 70 transmits and receives packets of various types of messages to or from another IP phone terminal 70 of another LAN 20 through the respective switching hubs 50, router type modems 30, and internets 90 to establish a session with said another IP phone terminal 70. After the establishment such a session, a call is connected through the transmission and reception of packets containing voice data. In the following explanation, the direction in which packets are transmitted from the internet 90 to the IP phone terminals 70 at the end of the LAN 20 is called "down link", while the direction in which packets are transmitted from the IP phone terminals 70 to the internet 90 is called "up link".

Figure 2:
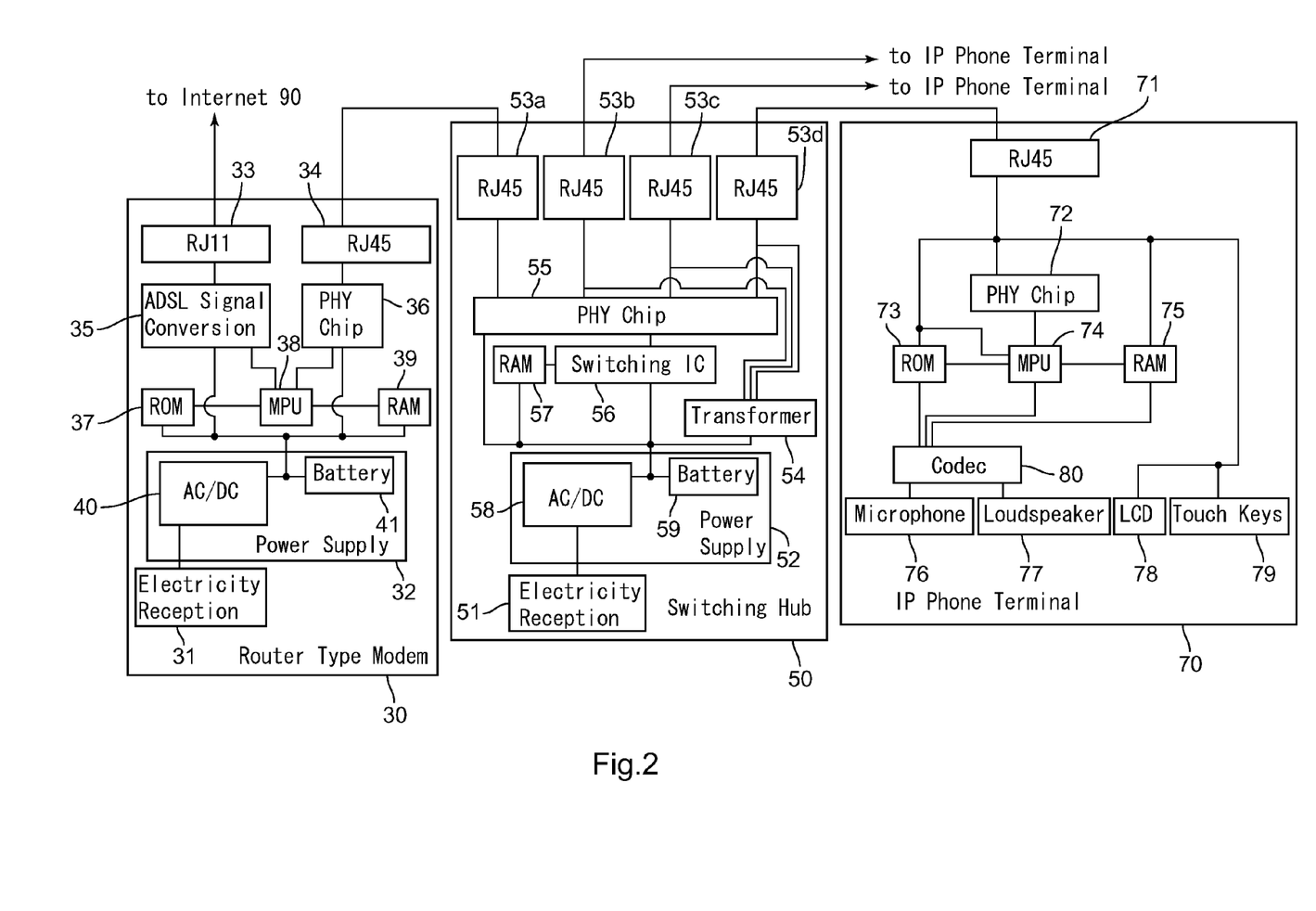
FIG. 2 is a hardware configuration diagram of a router type modem, a switching hub and an IP phone terminal which constitute the IP phone system of FIG. 1.

FIG. 2 is a hardware configuration diagram of a router type modem 30, a switching hub 50 and an IP phone terminal 70, which constitute the LAN 20.

As shown in FIG. 2, the router type modem 30 comprises a electricity reception terminal 31, a power supply unit 32, a RJ11 connector 33, a RJ45 connector 34, an Asymmetric Digital Subscriber Line (ADSL) signal conversion circuit 35, a Physical Layer (PHY) chip 36, a ROM 37, a MPU 38, and a RAM 39. Of these parts, the power supply unit 32, the ADSL signal conversion circuit 35, the PHY chip 36, the ROM 37, the MPU 38 and the RAM 39 are contained in an approximately rectangular casing (not shown). The RJ11 connector 33 and the RJ45 connector 34 are exposed to the exterior of the rear face of the casing. The electricity reception terminal 31 is connected to the end of a power cable which is pulled out from a hole made onto the casing.

The electricity reception terminal 31 is configured as an electric plug in which a pair of metallic protrusions called blades projects out of holes perforated through the front end of a covering (not shown) of the electricity reception terminal and the blades are connected to one end of electric wires in the power cable. When the blade of the electricity reception terminal 31 is inserted into a socket of a commercial AC power source, AC power is supplied through the power cable to the power supply unit 32. The power supply unit 32 comprises an AC/DC converter 40 and a battery 41. The AC/DC converter 40 converts the AC power supplied by the commercial AC power source into DC power. The DC power obtained by the conversion is supplied to each part of the router type modem 30 through electric wire and charges the battery 41. If supply of the AC power is stopped due to a power failure or the like, or if the quality of the power becomes poor, the electric power charged on the battery 41 is supplied to each part of the router type modem 30.

The RJ11 connector 33 is connected to the internet 90 through a modem cable. On the other hand, the RJ45 connector 34 is connected to a RJ45 connector 53a (described below) of the switching hub 50 through an unshielded twist pair (UTP) cable.

The ADSL signal conversion circuit 35 converts an analog signal provided by the RJ11 connector 33 into an Ethernet (Registered Trademark) frame (hereinafter called simply as "frame") of code sequences and then provides the code sequences to the MPU 38. Conversely, the ADSL signal conversion circuit 35 converts a frame of code sequences provided by the MPU 38 into an analog signal and then provides the analog signal to the RJ11 connector 33. The PHY chip 36 converts a digital signal provided by the RJ45 connector 34 into a frame of code sequences and then provides the code sequences to the MPU 38. Conversely, the PHY chip 36 converts a frame of code sequences provided by the MPU 38 into a digital signal and then provides the digital signal to the RJ45 connector 34.

Figure 3:
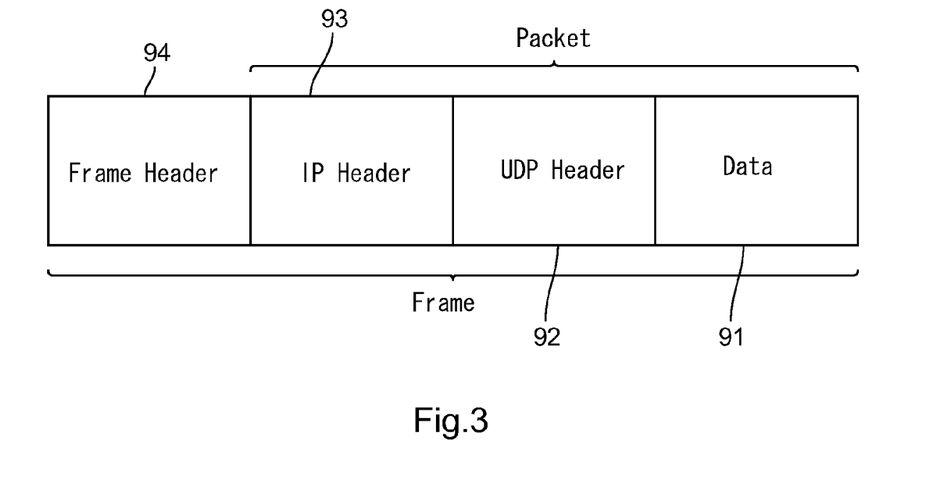
FIG. 3 is a data structure diagram of a frame, which is a signal that is used in the IP phone system of FIG. 1.

FIG. 3 is a diagram showing the data structure of a frame which includes data 91 to be delivered to a program (such as an SIP program) belonging to the application layer of TCP/IP and also includes a UDP header 92, an IP header 93 and a frame header 94 which are added ahead of the data 91. The part of the frame excluding the frame header 94 corresponds to "packet".

The UDP header 92 contains a code sequence indicating a source port number unique to the program on the application layer at the source transmitting the data and a code sequence indicating a destination port number unique to the destination program. The IP header 93 contains a code sequence indicating a source IP address of the packet source and a destination IP address to which the packet is addressed. The frame header 94 contains a code sequence indicating a Media Access Control (MAC) address of the source transmitting the frame and a MAC address of the destination to which the frame is addressed.

In FIG. 2, the ROM 37 stores a program containing procedures for executing processes related to packet routing and the like. The MPU 38, which executes such a program, assigns IP addresses (Private IP address) to the IP phone terminals 70 on its downlink side, writes a routing table and an address managing table into the RAM 39, and rewrites a MAC address and/or a port number which are contained in a frame.

Being supplied a frame of code sequences from the ADSL signal conversion circuit 35, the MPU 38 finds the destination of the packet in the frame on the basis of the destination IP address in the IP header 93 of that frame and determines whether the destination of the packet is any of the IP phone terminals 70 on its downlink side. If the destination of the packet in the frame is anyone of the IP phone terminals 70, the MPU 38 rewrites the destination MAC address in the frame of code sequences from the address of itself to that of the destination (IP phone terminal 70) of the packet and supplies the code sequence, of which the MAC address has been rewrote, to the PHY chip 36. The frame of code sequences supplied to the PHY chip 36 are converted into a digital signal, transmitted through the RJ45 connector 34 to the switching hub 50, and then transferred to the destination IP phone terminal 70.

Being supplied a frame of code sequences from the PHY chip 36, the MPU 38 finds the destination of the packet on the frame on the basis of the destination IP address in the IP header 93 of that frame and determine whether the destination of the packet is a node (such as the VoIP network control device 10) on its uplink side or not. If the destination of the packet in the frame is a node on its uplink side, the MPU 38 rewrites the destination MAC address in the frame of code sequences from the address of itself to that of the nearest node on the transferring route to the destination and supplies the code sequence, of which the MAC address has been rewrote, to the ADSL signal converter circuit 35. The frame of code sequences supplied to the ADSL signal converter circuit 35 are converted into an analog signal, transmitted through the RJ11 connector 33 to a public network, and then transferred to the destination node.

As shown in FIG. 2, the switching hub 50 comprises an electricity reception terminal 51, a power supply unit 52, a plurality of RJ45 connectors 53a to 53d (hereinafter referred as "RJ45 connectors 53" suitably), a transformer 54, a PHY chip 55, a switching integrated circuit (IC) 56 (corresponding to "first switching device"), and a RAM 57. Of these parts, the power supply unit 52, the transformer 54, the PHY chip 55, the switching IC 56, the RAM 57 are contained in an approximately rectangular casing (not shown). The RJ45 connector 53 is exposed to the exterior of the rear face of the casing. The electricity reception terminal 51 is connected to a power cable which is pulled out from a hole made onto the casing.

The electricity reception terminal 51 is an electric plug with the same structure as the electricity reception terminal of the router type modem 30. Therefore, by inserting the blades, which are protrusion on the electricity reception terminal 51, into the socket of the commercial AC power source, AC power is supplied from the commercial AC power source through the power cable to the power supply unit 52. The power supply unit 52 comprises an AC/DC converter 58 and a battery 59 (corresponding to "electricity storage means"). The structures of these units are the same as those of the router type modem 30.

The RJ45 connector 53a, which is one of the RJ45 connectors 53, is reserved for the router type modem 30 and connected to the RJ45 connector 34 of the router type modem 30 through an UTP cable. On the other hand, the remaining RJ45 connectors 53b to 53d are reserved for the IP phone terminals 70 and connected to the RJ45 connectors 71 (mentioned below) of the IP phone terminals 70 respectively through UTP cables.

As shown in FIG. 2, the AC/DC converter 58 and the battery 59 of the power supply unit 52 inside the switching hub 50 are coupled with the PHY chip 55, the switching IC 56, and the RAM 57 by electric wire, and provide an electric power to each of these elements by electric wire. Furthermore, the AC/DC converter 58 and the battery 59 are also coupled, through the transformer 54, with a part of the connection terminals (mentioned below) of the RJ45 connectors 53b to 53d for the IP phone terminals 70. Accordingly, an electric power is supplied through these connection terminals to the IP phones 70.

Figure 4:
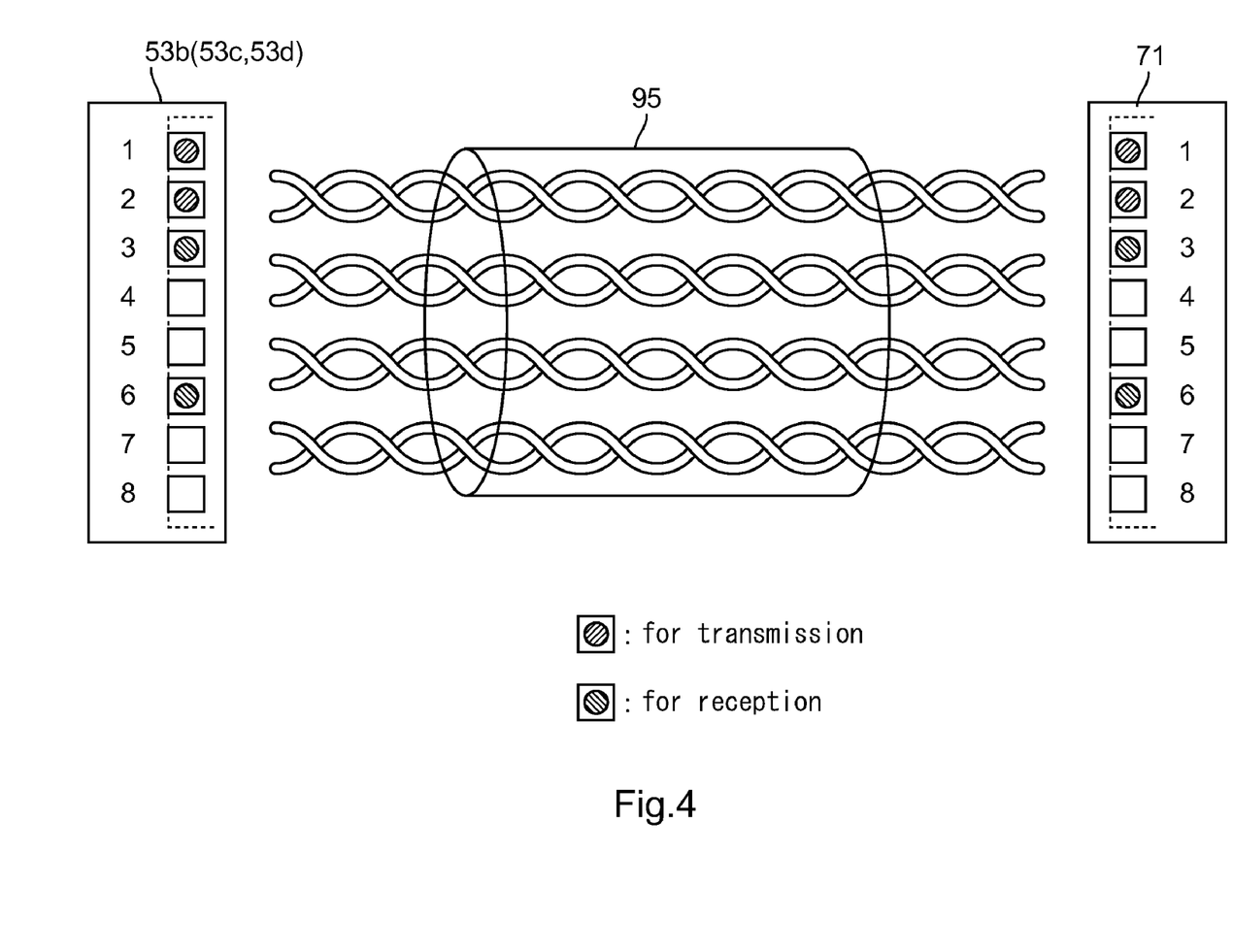
FIG. 4 is a diagram showing a connection terminal arrangement of RJ45 connectors used in the IP phone system of FIG. 1 and a cross-sectional configuration of a UTP cable.

FIG. 4 is a diagram showing a terminal arrangement of two RJ45 connectors, one of which is the RJ45 connector 53b, 53c or 53d and the other is the RJ45 connector 71, and a cross-sectional configuration of the UTP cable which connects the RJ45 connector 53b, 53c or 53d with the RJ45 connector 71. Each of the RJ45 connectors 53b to 53d and 71 is structured by eight connection terminals numbered from "1" to "8" being arrayed. Each of the RJ45 connectors 53b to 53d of the router type modem 30 is formed as a Medium Dependent Interface-X (MDI-X) type connector in which 1st and 2nd connection terminals are assigned for transmitting a digital signal and 3rd and 6th connection terminals are assigned for receiving. On the other hand, the RJ connector 71 of an IP phone terminal 70, mentioned below, is formed as a MDI type connector in which 1st and 2nd connection terminals are assigned for receiving a digital signal and 3rd and 6th connection terminals are assigned for transmitting. In the present embodiment, 7th and 8th connection terminals (corresponding to "residual terminals") of the RJ45 connectors 53b to 53d, which are not assigned for either transmitting or receiving a digital signal, are connected through electric wire to the AC/DC converter 58 and the battery 59. That is, by connecting any of the RJ45 connectors 53b to 53d of the switching hub 50 and the RJ45 connector 71 of an IP phone terminal 70 with respective ends of the straight type UTP cable 95 formed by eight electric wires twisted by each pair, not only a digital signal is transmitted and received through the 1st, 2nd, 3rd and 6th connection terminals (packet terminals) but also electric power can be supplied from the switching hub 50 to the IP phone terminal 70 through the 7th and 8th connection terminals.

Returning to the explanation of FIG. 2, the PHY chip 55 of the switching hub 50 converts a digital signal supplied from the RJ45 connectors 53a to 53d into a frame of code sequences and supplies it to the switching IC 56. The PHY chip 55 also converts a frame of code sequences supplied from the switching IC 56 into a digital signal and supplies it to any of the RJ45 connectors 53a to 53d specified the switching IC 56.

The switching IC 56 executes processes such as writing an address management table into the RAM 57, and transmitting a frame in accordance with the address management table.

The switching IC 56 stores a frame of code sequences supplied from the PHY chip 55 into the RAM 57, and then specifies the destination MAC address of that frame. Furthermore, the switching IC 56 supplies the frame of code sequences to the PHY chip 55 with instructing that the frame is to be transmitted to the RJ45 connecter 53 which is connected with the IP phone terminal 70 or the router type modem 30 indicated by the specified destination MAC address. The frame of code sequences supplied to the PHY chip 55 are converted into a digital signal and transmitted from the instructed RJ45 connector 53 to the IP phone terminal 70 or the router type modem 30.

Each of the IP phone terminals 70 comprises the RJ45 connector 71, a PHY chip 72, a ROM 73, an MPU 74, a RAM75, a microphone 76, a loudspeaker 77, a Liquid-Crystal-Display (LCD) 78, touch keys 79, and a codec 80. Of these parts, the PHY chip 72, the ROM 73, the MPU 74, the RAM 75, and the codec 80 are contained in an approximately rectangular casing (not shown). The RJ45 connector 71, the LCD 78 and touch keys 79 are exposed to the exterior of the rear or front face of the casing. Each of the PHY chip 72, the ROM 73, the MPU 74 and the codec 80 is connected to the 7th and 8th connection terminals of the RJ45 connector 71 by electric wire and supplied, through these connection terminals, electric power from the switching hub 50. Therefore, the IP phone terminals 70 are not equipped with a power supply unit.

The RJ45 connector 71 is a connector having MDI type connection terminal arrangement and, as described above, through the 7th and 8th connection terminals of the connector, electric power supply from the switching hub 50 is received.

Under the control of the MPU 74, the LCD 78 displays various types of information. The touch keys 79 include dial keys and the like to supply a signal to the MPU 74 for indicating detection of each key operation.

The microphone 76 pickups a sound wave and supplies it as a voice signal to the codec 80. The loudspeaker 77 emits sound according to the voice signal supplied from the codec 80. The codec 80 encodes a voice signal into voice data and decodes voice data into a voice signal.

The PHY chip 72 converts digital signals supplied from the RJ45 connector 71 into a frame of code sequences and supplies it to the MPU 74. Conversely, the PHY chip 72 converts a frame of code sequences supplied from the MPU 74 into a digital signal and supplies it to the RJ45 connector 71.

The ROM 73 stores the phone number unique to the terminal, an SIP program and the like. The MPU 74, which executes the SIP program, establishes a session with an IP phone terminal 70 in another LAN network and realizes a call by transmitting and receiving packets containing voice data to and from that IP phone terminal 70.

Figure 5:
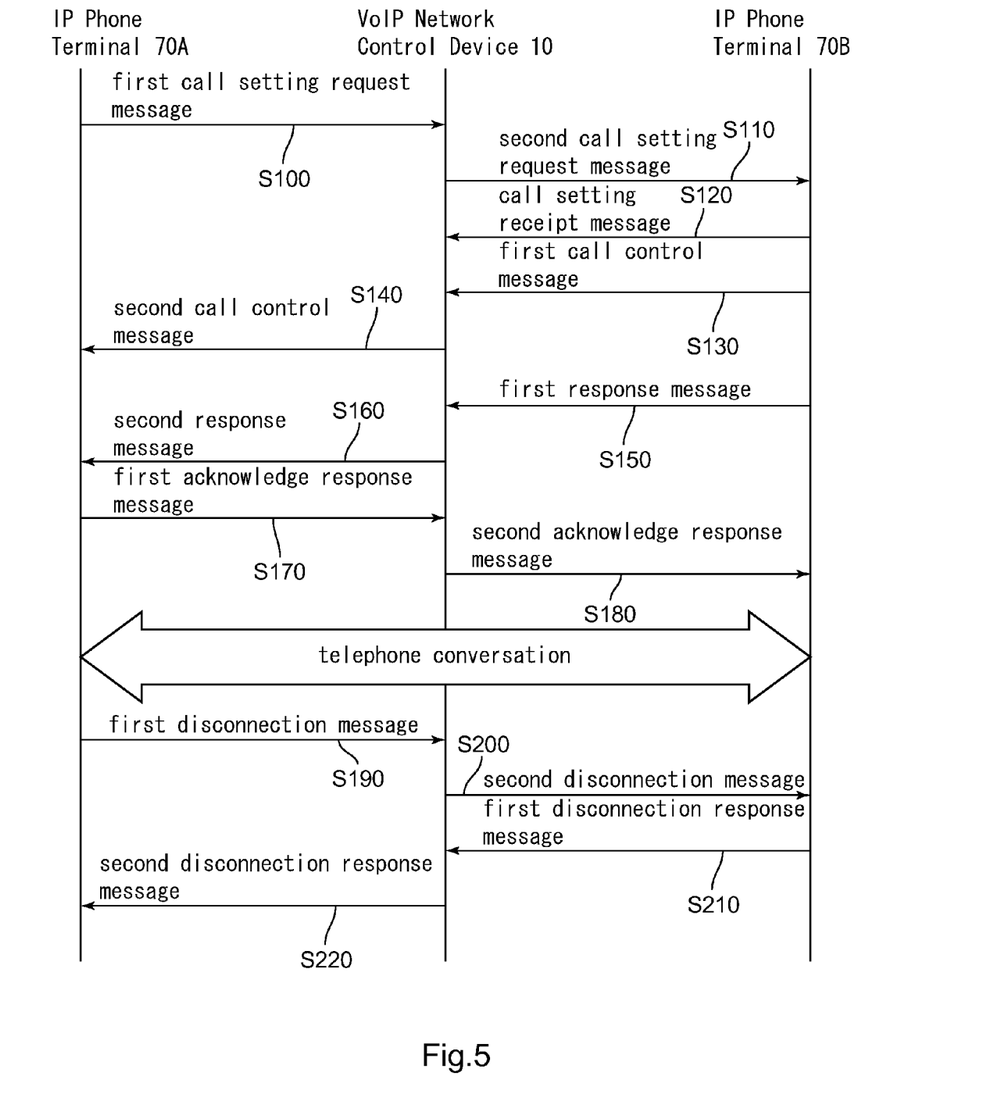
FIG. 5 is a sequence diagram showing steps for establishing a session for a call between two IP phone terminals until its termination for the IP phone system of FIG. 1.

FIG. 5 is a sequence diagram showing a procedure from establishing a call session to terminating it between two IP phone terminals 70. In FIG. 5, the IP phone terminal 70 originating a call is referred as IP phone terminal 70A while the IP phone terminal 70 called is referred as IP phone terminal 70B.

First, the IP phone terminal 70A originating a call becomes in an off-hook state by, for example, the receiver being picked up and then is input a telephone number to be called by the touch keys being operated. The IP phone terminal 70A, which is received the input of the telephone number, transmits a first call setting request message packet a addressed to the IP address of the VoIP network control device 10 (S100). Having received the first call setting request packet, the VoIP network control device 10 transmits a second call setting request message packet addressed to the IP address of the IP phone terminal 70B (S110). The VoIP network control device 10 has a VoIP management table (not shown) which associates each of IP addresses of respective IP phone terminals with a telephone number. By referring to the VoIP management table in accordance with the telephone number included in the first call setting message, the VoIP network control device 10 specifies the IP address of the IP phone terminal 70B to which the second call setting request message is to be transferred.

Having received the second call setting request packet, the IP phone terminal 70B transmits a call setting receipt message packet addressed to the IP address of the VoIP network control device 10 (S120) and also transmits the call setting receipt message packet, the VoIP network control device 10 transmits a second call control message packet addressed to the IP address of the IP phone terminal 70A (S140.) The call setting receipt message indicates that the call has been received and ringing has begun at the called side but the terminal is not in an off-hook state.

When the called IP phone terminal 70B becomes in an off-hook state due to, for example, the receiver being picked-up, the IP phone terminal 70B transmits a first response message packet addressed to the VoIP network control device 10 (Step S150). Having received the first response message packet, the VoIP network control device 10 transmits a second response message packet addressed to the IP address of the IP phone terminal 70A (Step S160).

Receiving the second response message packet, the IP phone terminal 70A transmits a first acknowledge response message packet addressed to the IP address of the VoIP network control device 10 (S170). Having received the first acknowledge response message packet, the VoIP network control device 10 transmits a second acknowledge response message packet addressed to the IP address of the IP phone terminal 70B (S180).

Receiving the second acknowledge message packet, the IP phone terminal 70B reserves a port for receiving a packet including voice data so that a call connection between the reserved port and a port reserved in the IP phone terminal 70A is established. From then on, the voice data that correspond to sound waves picked up by the microphones 76 of the IP phone terminals are transmitted and received between the ports of the IP phone terminals 70A and 70B to realize a telephone conversation.

If one of the IP phone terminals 70 (the IP phone terminal 70A illustrated in FIG. 5) becomes in an on-hook state by an operation such as the phone receiver being put down, the IP phone terminal 70A transmits a first disconnection message packet addressed to the IP address of the VoIP network control device 10 (S190). Having received the first disconnection message packet, the VoIP network control device 10 transmits a second disconnection message packet addressed to the IP address of the IP phone terminal 70B (S200). It should be noted that the IP phone terminals 70A and 70B receive electric power from the switching hub 50 through the 7th and 8th connection terminals of their respective RJ45 connectors 71 and the switching hub 50 equips a battery 59 which is charged by electric power supplied from the electricity reception terminal 51. In this way, even if the power supply from the commercial AC power source is stopped due to a power failure, each of the IP phone terminals 70A and 70B can transmit and receive each of the above described messages to establish a session and to realize a call conversation.

Having received the second disconnection message packet, the IP phone terminal 70B transmits a first disconnection response message packet addressed to the IP address of the VoIP network control device 10 (S210). Receiving the first disconnection response message packet, the VoIP network control device 10 transmits a second disconnection response message packet addressed to the IP address of the IP phone terminal 70A (S220). When the IP phone terminal 70A receives the second disconnection response message packet, the call connection between the IP phone terminals 70A and 70B is disconnected and the call ends.

In the embodiment described above, the router type modem 30 and the switching hub 50 are respectively equipped with batteries 41 and 59 for charging backup electric power so that the power from the switching hub 50 can be supplied through the 7th and 8th connection terminals of the RJ45 connectors 53b to 53d to the IP phone terminals 70. Consequently, even when power supply from a commercial AC power source is stopped due to a power failure, the IP phone service can be continuously used by that power is supplied to the router type modem 30, the switching hub 50 and furthermore each part of the IP phone terminal 70 from the batteries 41 and 59.

[Second Embodiment]

A second embodiment of the present invention will be explained with referring to the drawings. In the switching hub 50 of the first embodiment, each of the RJ45 connectors 53b to 53d for IP phone terminals 70 are connected to the battery 59 through electric wires so that, when a power failure occurs, power is evenly supplied to each of the IP phone terminals 70 through their respective RJ45 connectors 53b to 53d. On the other hand, the switching hub 50 in the second embodiment is provided with switches inserted between the RJ45 connectors 53b to 53d and the battery 59. When a power failure occurs, these switches are individually controlled for power supply to some of the IP phone terminals to be restricted and a packet is transmitted to VoIP network control device 10 for requesting transference of a call for an IP phone terminal 70 to which power supply is restricted.

The hardware configurations in the second embodiment for the VoIP network control device 10, the router type modem 30, and the IP phone terminals 70 are the same as those in the first embodiment. Therefore, the repeated explanation is omitted.

Figure 6:
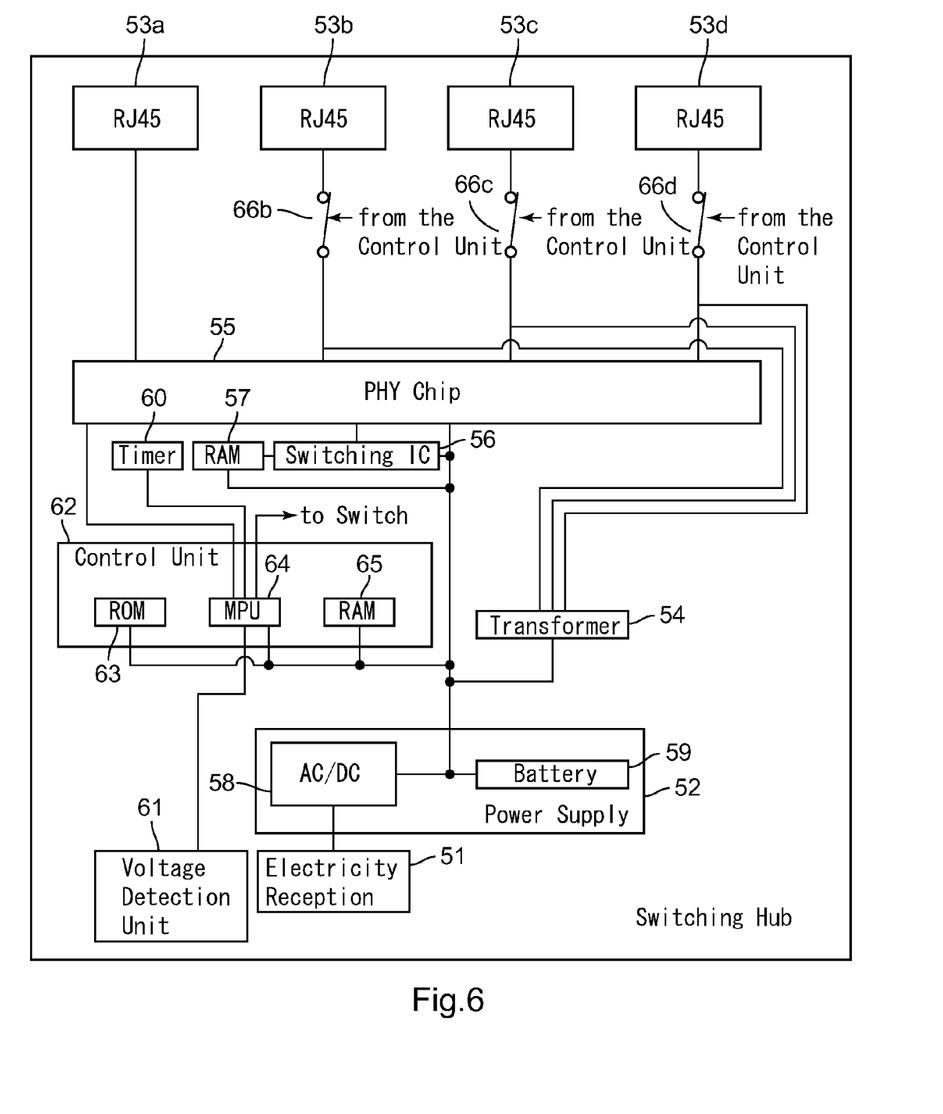
FIG. 6 is a hardware configuration diagram of a switching hub, which is the signal relay device of a second embodiment.

FIG. 6 shows a hardware configuration of the switching hub 50 which acts as a signal relay device of the second embodiment. As shown in FIG. 6, the switching hub 50 comprises a electricity reception terminal 51, a power supply unit 52, a plurality of RJ45 connectors 53a to 53d, a transformer 54, a PHY chip 55, a switching IC 56, RAM 57, a timer 60, a voltage detection unit 61 (corresponding to "detection means") and a control unit 62 (corresponding to "control means"). In the electric wires connecting the AC/DC converter 58 and the battery 59 with the RJ45 connectors 53b to 53d, switches (corresponding to "second switching device") 66b to 66d (suitably referred as "switches 66" hereinafter) are inserted respectively. These switches 66b to 66d become make or break by a signal supplied from the control unit 62. The timer 60 clocks time. The voltage detection unit 61 detects the voltage of the AC power supplied to the electricity reception terminal 51 and supplies a signal indicating the detected voltage to the control unit 62.

The control unit 62 comprises a ROM 63, an MPU 64, and a RAM 65. The ROM 63 of the control unit 62 stores a program containing procedures for, during a power failure, executing processes relating to make or break of the respective switches 66b to 66d and transmitting a message for requesting call transference. The MPU 64, which executes this program, generates a setting table in the RAM 65. This setting table consists of setting data for each of the RJ45 connectors 53b to 53d usable for IP phone terminals 70. When a power failure occurs, the MPU 64 executes the processes in accordance with the content of the setting table. The RAM 65, which stores the setting table, corresponds to "memory" in claims of the invention.

Figure 7:
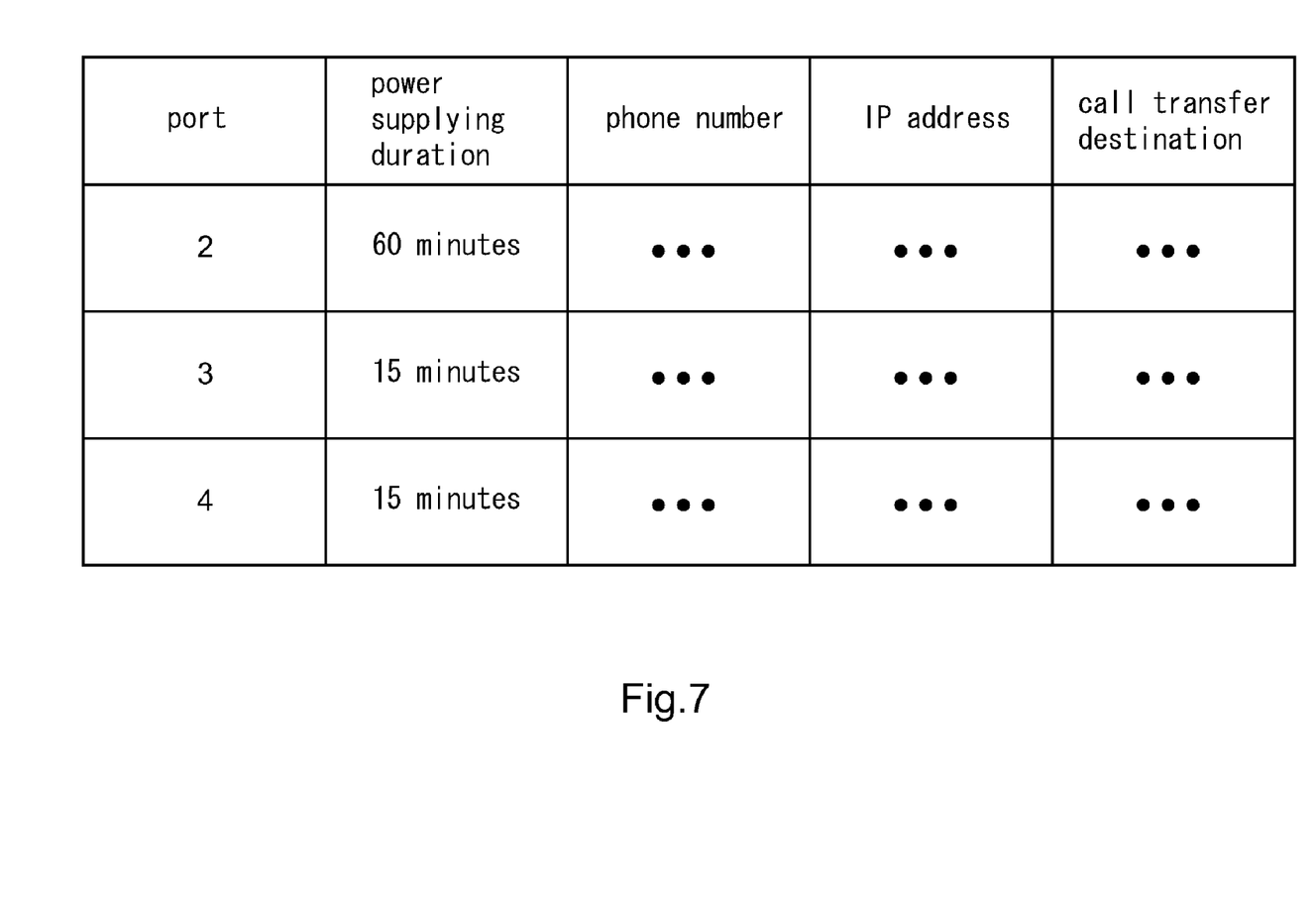
FIG. 7 is a data structure diagram of a settings table for the switching hub of FIG. 6.

FIG. 7 shows a data structure of the setting table. The setting table is a set of records corresponding to the RJ45 connectors 53b to 53d respectively. Each of the records, of which the table consists, comprises five fields of "port", "power supplying duration", "phone number", IP address" and "call transfer destination". The "port" fields store connector port numbers unique to the RJ45 connectors respectively. The "power supplying duration" fields store power supplying duration data which indicate the duration from the time at which the battery 59 starts to supply the charged power to the time at which the battery 59 stops to supply the power. The power supplying duration data may be preferably set individually with taking account of importance of frequency in use of the respective IP phone terminals connected to the RJ45 connectors 53b to 53. The "phone number" fields store data indicating phone numbers of the respective IP phone terminals 70. The "IP address" fields store IP addresses (private IP addresses) of the respective IP phone terminals 70 connected with the RJ45 connectors 53b to 53d. The "call transfer destination" fields store transfer destination data each of which indicates a destination for transferring a call for the IP phone terminal 70 to which power supply has stopped. The transfer destination data may be a phone number of a fixed phone or a cell phone. It may be also, the transfer destination data may be a phone number of a fixed phone or a cell phone, or may be an IP address (global address) of an IP phone terminal 70 in another LAN 20.

Figure 8:
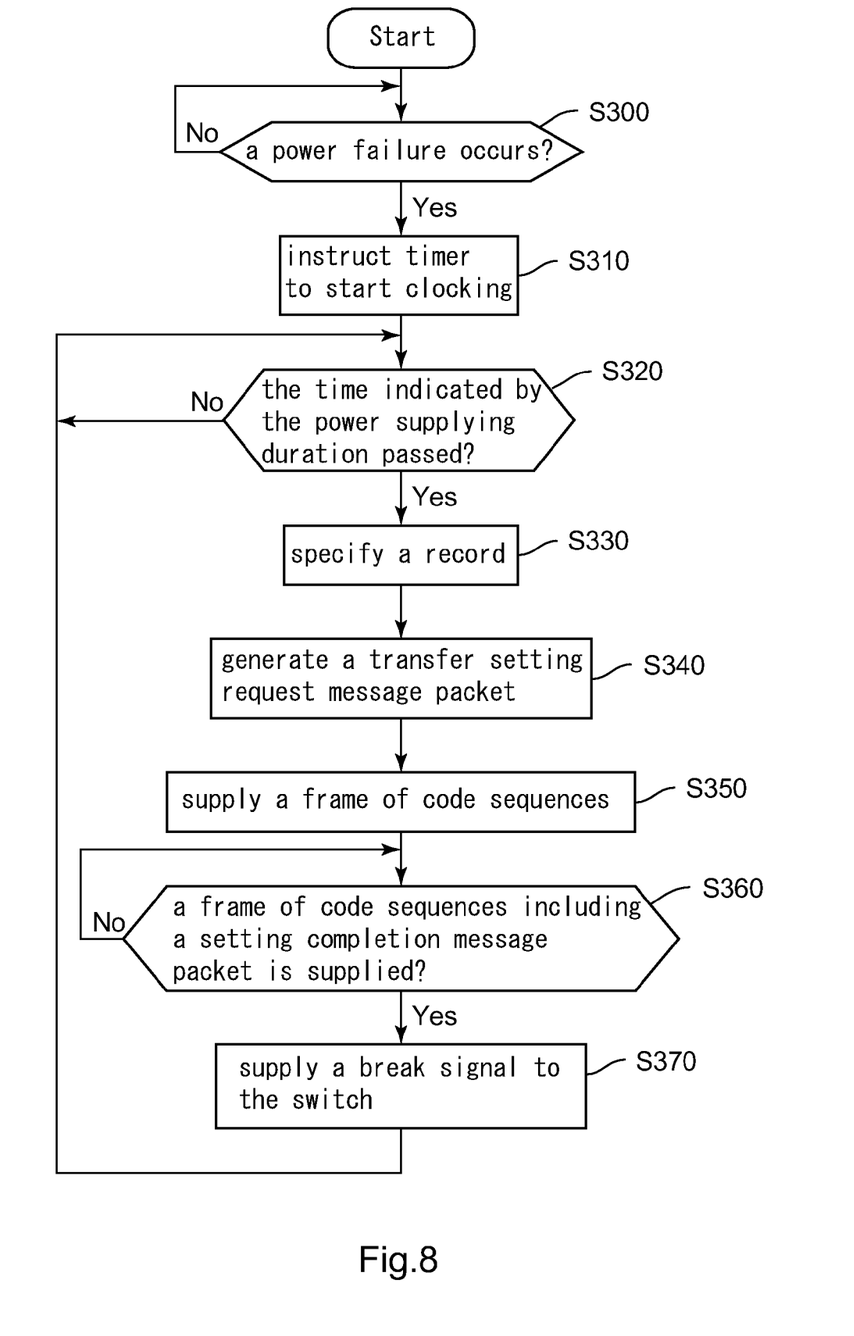
FIG. 8 is a flow chart showing a characteristic processes executed by the control unit of the switching hub in the IP phone system of FIG. 1.

FIG. 8 shows a flow chart of the characteristic processes executed by the control unit 62 of the switching hub 50. The control unit 62 of the switching hub 50 monitors an occurrence of a power failure based on s signal supplied from the voltage detection unit 61. If it is determined that a power failure occurs (S300: Yes), the control unit 62 supplies the timer 60 with an instruction signal to start clocking or measuring time (S310). Having received the instruction signal, the timer 60 successively supplies the control unit 62 with a signal indicating the time passed since it received the instruction signal.

Having supplied the instruction signal to the timer 60, the control unit 62 determines, under support from the timer 60, whether or not the elapse tine exceeds any of the durations indicated by the power supplying duration data in the "power supplying duration" fields of the records in the setting table (S320).

When it is determined that a duration indicated by any of power supplying duration data has been passed (S320: Yes), the control unit 62 specifies the record containing such a power supplying duration datum from the setting table (S330). Subsequently, the control unit 62 generates a transfer setting request message packet addressed to the VoIP network control device 10 (S340). The transfer setting request message contains the phone number recorded in the "phone number" field, the IP address recorded in the "IP address" field, and a transfer destination data recorded in the "call transfer destination" field, in the record specified in the step S330. Furthermore, the control unit 62 supplies the PHY chip 55 with a frame of code sequences which include the transfer setting request message packet and is embedded the MAC address of the router type modem 30 as the destination MAC address (S350). This frame of code sequences are converted into a digital signal by the PHY chip 55 and transmitted through the RJ45 connector 53a to the router type modem 30. Then, the frame of code sequences are converted in the router type modem 30 to be transmitted through the internet 90 to the VoIP network control device 10.

Receiving the transfer setting request message packet, the VoIP network control device 10 specifies, from its own VoIP management table, a pair of a phone number and an IP address which is same as that included in the transfer setting request message in that from packet and replaces the IP address in the specified pair with the transfer destination data included in the transfer setting request message. After such replacement, if the VoIP network control device 10 receives a call setting request message (S100 in FIG. 5) including the phone number of the specified pair, the destination of the second call setting request message (S110 in FIG. 5) is specified based on the phone number of a fixed phone or a cell phone indicated in the transfer destination data. Having replaced the transfer destination data with an IP address, the VoIP network control device 10 transmits a setting completion message packet addressed to the destination of the transfer setting request message.

After transmitting the transfer setting request message packet, the control unit 62 of the switching hub 50 waits to receive a setting completion message. Being supplied with a frame of code sequences including a setting completion message packet from the PHY chip 55 (S360: Yes), the control unit 62 supplies a signal (break signal) to a switch 66 of an RJ45 connector 53 (for example, the switch 66b of the RJ45 connector 53b) corresponding to the connector port number in the "port" field of the record specified in the step S330 (S370). If the switch 66, which has received the signal (break signal), changes its state from a make state to a break state, power supply from the battery 59 to the IP phone 70 connected to the associated RJ45 connector 53 is stopped. After supplying the signal (break signal) to the switch 66, the control unit 62 returns to the step S320 and proceeds with the following processes based on whether or not the time indicated in the "power supplying duration" field of another record has passed.

The he switching hub 50 of the second embodiment described above stops power supply to the IP phone terminals in the order of the power supplying duration set in the setting table having passed on a power failure. Therefore, an IP phone terminal 70 which is rarely used is cut the power supply earlier, while an IP phone terminal which is used with high frequency is supplied power for longer period of time so that the life of the battery 59 can be lengthened. An IP phone terminal 70 whose power supplying duration has passed is cut power supply after a transfer setting request message is transmitted to the VoIP network control device 10 and the setting completion message is received in response. Therefore, it can be avoided that a call to an IP phone terminal 70 whose power supply is cut becomes an error.

[Other Embodiments]

The present invention is not only limited to the above embodiments but can be extended to various modifications.

In the above described embodiments, backup power stored in the battery 59 of the switching hub 50 is supplied to the IP phone terminals 70 through the RJ45 connectors 53b to 53d respectively. Alternatively, by connecting the IP phone terminals 70 to the RJ45 connector 34 of the router type modem 30, power stored in the battery 41 of the router type modem 30 may be supplied to the IP phone terminals 70 through the RJ45 connector 34. In this case, the router types modem 30 acts as a signal relay device. If there is provided another network device acting as a signal relay device, such as a bridge, a modem or the like, which is inserted between the IP phone terminals 70 and the internet 90, able to relay a packet transferred from a node in the internet 90 to an IP phone terminal 70 and configured to be able to store backup power in accordance with AC power supplied from a commercial AC power source to itself, the IP phone terminal may be connected to such a network device.

In the second embodiment, after power supplying duration has passed, a transfer setting request message is transmitted to the VoIP network control device 10, power supply to the IP phone terminal is cut in the order of receiving a setting completion message in response to the transfer setting request message.

Alternatively, or in conjunction with the above described method, after power supplying duration for one of the RJ45 connectors 53b to 53d associated with one of the IP phones 70 has passed, a voice data packet for notifying the stop of power supply may be supplied to that IP phone terminal 70 to make its loudspeaker 77 speak the notice. Similarly, a text data packet of a character sequence for notifying the stop of power supply may be supplied to the one of the IP phone terminals 70 to make the LCD 78 display the character sequence. Such display can be used in place of each of the above described methods, in conjunction with one of the above described methods, or in conjunction with all of the above described methods.

Rather than using the IP phone terminals 70 as a terminal device connected to the signal relay device, a regular fixed-line phone may also be used.

The invention claimed is:

1. A signal relay device comprising:
    a power reception terminal that is coupled to an AC power source,
    a plurality of connectors containing a plurality of terminal pins for receiving and transmitting a signal such as a packet signal in which the terminal pins are coupled to each other by wire,
    a power charging unit that is coupled to the power reception terminal by wire and stores a backup power based on an AC power provided from the power reception terminal, the backup power being supplied to wires coupled to a part or all of the plurality of connectors wherein each of the plurality of connectors includes a packet terminal pin that receives or transmits a signal representing a packet, and a residual terminal pin that does not, and
    the signal relay device further comprises a second switching element which is inserted between the wire coupled to the residual terminal pin of each of the connectors and the wire coupled to the power charging unit, the second switching element switching on or off the individual connection between the residual terminal pin and the power charging unit.

2. The signal relay device according to claim 1, further comprising:
    a memory that stores an address for a terminal device coupled to any one of the plurality of connectors and a transfer destination data associated with the transfer destination of the packet addressed to the terminal device, as paring the address for a terminal device with the transfer destination data,
    a detection unit that detects the voltage of the AC power provided from the power reception terminal, and
    a control unit that provides a signal instructing the second switching element to couple the wire coupled to the residual terminal pins of a part of the plurality of connectors to the wire coupled to the power charging unit under the condition that the voltage detected by the detection unit satisfies a predetermined condition, wherein as for the remaining connectors, the control unit identifies a transfer destination data that are associated with one or more of the addresses of the terminal devices coupled to such remaining connectors and then, the control unit outputs a packet that indicates a transfer request message containing the identified transfer destination data through the connectors to which no terminal devices are coupled.

* * * * *